(12) United States Patent
Heiss-Chouquet et al.

(10) Patent No.: US 12,630,457 B2
(45) Date of Patent: May 19, 2026

(54) GLASS ELEMENT WITH CUT EDGE AND METHOD OF PRODUCING SAME

(71) Applicant: SCHOTT AG, Mainz (DE)

(72) Inventors: Markus Heiss-Chouquet, Bischofsheim (DE); Matthias Jotz, Mainz (DE); Clemens Ottermann, Hattersheim (DE)

(73) Assignee: SCHOTT AG, Mainz (DE)

( * ) Notice: Subject to any disclaimer, the term of this patent is extended or adjusted under 35 U.S.C. 154(b) by 148 days.

(21) Appl. No.: 18/504,204

(22) Filed: Nov. 8, 2023

(65) Prior Publication Data

US 2024/0150215 A1 May 9, 2024

Related U.S. Application Data

(62) Division of application No. 16/706,184, filed on Dec. 6, 2019, now Pat. No. 11,851,361.

(30) Foreign Application Priority Data

Dec. 6, 2018 (DE) ..................... 10 2018 131 179.6

(51) Int. Cl.
*C03B 33/023* (2006.01)
*C03B 33/027* (2006.01)
(Continued)

(52) U.S. Cl.
CPC ........ *C03B 33/0235* (2013.01); *C03B 33/027* (2013.01); *C03B 33/037* (2013.01); *C03B 33/04* (2013.01); *C03B 33/105* (2013.01)

(58) Field of Classification Search
CPC ... Y02E 30/30; C03B 33/0235; C03B 33/027; C03B 33/037; C03B 33/04; C03B 33/105
See application file for complete search history.

(56) References Cited

U.S. PATENT DOCUMENTS

2004/0251290 A1 12/2004 Kondratenko
2009/0126403 A1 5/2009 Abramov
(Continued)

FOREIGN PATENT DOCUMENTS

CN 102964060 3/2013
CN 105102384 11/2015
(Continued)

OTHER PUBLICATIONS

Rong, "Simple analysis of cutter wheel cutting process for TP glass", Guangdong University of Science and Technology, Science and Technology Information, Dec. 31, 2012, p. 162, with English translation.

(Continued)

*Primary Examiner* — Lawrence D Ferguson
(74) *Attorney, Agent, or Firm* — Ruggiero McAllister & McMahon LLC

(57) ABSTRACT

A sheet-like glass element has a thickness less than or equal to 0.5 mm and an edge with an edge face intersecting opposite glass faces along two edge lines. The edge face has strip-like sections with each one adjoining a respective one of the edge lines. The strip-like sections interface along a boundary line that extends between the edge lines. The strip-like sections have a first section with a width ranging from 2 μm to 8 μm and have a first waviness that is lower than a second waviness of a second strip-like section. The second waviness decreases towards the edge line.

12 Claims, 5 Drawing Sheets

(51) Int. Cl.
| | |
|---|---|
| *C03B 33/037* | (2006.01) |
| *C03B 33/04* | (2006.01) |
| *C03B 33/10* | (2006.01) |

(56) References Cited

U.S. PATENT DOCUMENTS

| | | |
|---|---|---|
| 2011/0226832 A1 | 9/2011 | Bayne |
| 2015/0315059 A1 | 11/2015 | Abramov |
| 2016/0185647 A1 | 6/2016 | Vogt |
| 2017/0217817 A1 | 8/2017 | Jotz |
| 2017/0355635 A1 | 12/2017 | Li |

FOREIGN PATENT DOCUMENTS

| | | |
|---|---|---|
| CN | 107108322 | 8/2017 |
| DE | 102014117641.3 | 8/2017 |
| DE | 102016101766 | 10/2017 |
| EP | 2507182 | 10/2012 |
| JP | 2003183040 | 7/2003 |
| JP | 2018001535 | 1/2018 |
| JP | 2018015945 | 2/2018 |
| JP | 2018051945 | 4/2018 |
| KR | 20160089865 | 7/2016 |
| KR | 20170038152 | 4/2017 |
| TW | 201628751 A | 8/2016 |
| WO | 2015198748 | 12/2015 |
| WO | 2017026191 | 2/2017 |
| WO | 2017147223 | 8/2017 |

OTHER PUBLICATIONS

Ahn, "Sliding microindentation fracture of brittle materials: Role of elastic stress fields", Aug. 1998, Mechanics of Materials, 29, 143-152 (Year: 1998).

Gross, "Scratch damage in ion-Exchanged Alkali Aluminosilicate Glass: Crack Evolution and the Dependence of Lateral Cracking Threshold on Contact Geometry", Chapter in Varner, James R., and Marlene Wightman. Fractography of Glasses and Ceramics VI: Ceramic Transactions, Wiley, 2012. (Year: 2012).

Ono, "Effective of Scribing Wheel Dimensions on the Cutting of of AMLCD Glass Substrates". Corning Display Technologies. Technical Information Paper 306. Nov. 2004. (Year: 2004).

(a)                                          (b)

GLASS ELEMENT WITH CUT EDGE AND METHOD OF PRODUCING SAME

CROSS REFERENCE TO RELATED APPLICATIONS

This application is a divisional of U.S. application Ser. No. 16/706,184 filed on Dec. 6, 2019, that claims benefit under 35 USC § 119 of German Application 10 2018 131 179.6 filed Dec. 6, 2018, the entire contents of which are incorporated herein by reference.

BACKGROUND

1. Field of the Disclosure

The disclosure generally relates to the processing of sheet glass elements. More particularly, the disclosure relates to the cutting of such glass elements by scoring and breaking. The disclosure also relates to glass substrates, in particular thin glass substrates, cut to size using such method.

2. Description of Related Art

Nowadays, glass sheets or flat glass elements are mostly manufactured in a continuous process in which a glass ribbon is drawn from a melt or from a softened glass. Later, glass elements are separated from this glass ribbon. Common techniques for producing glass ribbons include the float process, several up-draw and down-draw processes, the overflow fusion process, as well as the redraw process in which a preform is heated locally and drawn into a glass ribbon in the heated area. All these techniques have in common that the glass ribbons form a thickened portion along the two edges thereof also known as a bead. In order to allow the glass ribbon to be better guided and processed, it is desirable to separate the beads before cutting to size the glass ribbon into individual glass elements.

According to the current state of the art, the beads of thin glass ribbons are usually cut by laser. However, it has been found that laser processes such as in particular laser-induced stress-crack cleaving may become unstable, so that the crack may drift when long ribbons are cut.

Another important issue when cutting glass, in general, is the strength of the glass elements. The resistance of glass elements against bending loads is essentially determined by the glass edges. Their breaking strength is typically significantly lower than the breaking strength of the glass faces. Thus, a fracture of a glass sheet predominantly emanates from the edges of the sheet. Therefore, it is desirable to achieve the highest possible resistance of the glass edges to tensile, shear, torsional, and bending loads. The two-parameter Weibull distribution of breaking strength typically used to characterize the strength of brittle materials requires a high characteristic value as well as a high modulus in order to achieve high service life expectancies of the glass elements cut to size.

SUMMARY

The disclosure is therefore based on the object to make the cutting of thin glasses more reliable and to improve edge strength.

Accordingly, a method is provided of scoring glasses, preferably thin glasses having a thickness of at most 0.5 mm, in preparation of separation for processing glass elements, in which a deep crack is generated in the glass along an intended separation line by exerting pressure onto the glass surface using a rigid scoring tool, wherein the scoring tool, by being pressed onto the glass surface and due to the advancement force while introducing the deep crack generates a zone of elastic strain in the glass with a directional component of the elastic strain parallel to the glass surface and perpendicular to the separation line, which extends in an arc in the plane defined by the separation line perpendicular to the glass surface such that one leg of the arc is located close to the contact point of the scoring tool on the glass surface and another leg is located inside the glass, said arc being open towards the advancement direction of the scoring tool.

Thus, the method ensures that a tensile stress is built up in the glass directly below the scoring tool, causing crack formation in the form of a deep crack which is useful as a preliminary crack for a score-and-break process.

For this purpose, an apparatus configured for carrying out the method for scoring glasses comprises: a rigid scoring tool and a device for pressing the scoring tool against the glass surface of a glass element to be scored; an advancement device for moving relative to each other the glass element and the scoring tool along a separation line to produce a deep crack in the glass element by the pressure of the scoring tool against the glass surface and the advancement force, wherein the scoring tool is configured such that, under the pressure force and advancement force exerted when introducing the deep crack, the zone of elastic strain mentioned above is produced in the glass with a directional component of the elastic strain parallel to the glass surface and perpendicular to the separation line, this zone extending in an arc in the plane defined by the separation line perpendicular to the glass surface such that one leg of the arc is located close to the contact point of the scoring tool on the glass surface and another leg is located inside the glass, the arc being open towards the advancement direction of the scoring tool.

In addition to the aforementioned elastic strain in the direction along the glass surface and perpendicular to the separation line, i.e. across the separation line for short, elastic strain also occurs along the separation line and along the surface. This component of tensile stress along the separation line is smaller and thus less important for the direction of the resulting deep crack.

In the context of the present disclosure, the term "rigid scoring tool" is understood to mean that the scoring tool does not roll on the glass surface like a scoring wheel, but slides over the glass surface while slightly penetrating into the glass by virtue of the pressure or contact force.

The advancement direction is understood to mean only relative to the glass surface. The advancement over the glass surface may be achieved by moving the scoring tool over a fixed glass element, or else the other way round by moving the glass element while holding fixed the scoring tool. Combined movement of the scoring tool and the glass element is conceivable and possible as well.

For separation along a deep crack so created, a bending, tensile or shear load can later be applied onto the glass along the separation line. Accordingly, the disclosure also provides a method for cutting to size glass elements, which comprises producing a deep crack in the glass using the method described above, and subsequently, for separation along the deep crack, applying a bending or tensile or shear load onto the glass along the separation line so that the glass breaks along the separation line due to the weakening induced by the deep crack.

The disclosure also allows to produce pre-scored thin glass elements as semi-finished products for small thin glass sheets that will find useful application in various fields of consumer electronics. Such thin glass sheets obtained after scoring and breaking are suitable as cover glasses for display devices, touch panels, solar cells, semiconductor modules, or LED light sources. Small thin glass sheets may also be used as constituents in capacitors, thin-film batteries, flexible printed circuit boards, flexible organic light-emitting diodes (OLEDs), flexible photovoltaic modules, or even e-papers. The type of thin glass can be specifically selected according to the intended field of application to meet the respective requirements on chemical resistance, thermal shock resistance, heat resistance, gas tightness, high electrical insulation capacity, matched expansion coefficient, flexibility, high optical quality, and light transmission with high surface quality. Thin glass produced according to the fabrication methods described above usually has a fire-polished surface on both thin glass faces and thus exhibits very low roughness.

Particularly suitable for scoring with the intended specially shaped zone of elastic strain in the glass is a scoring tool in the form of a scoring diamond.

The disclosure will now be explained in more detail with reference to the accompanying figures. In the figures, the same reference numerals designate the same or equivalent elements.

DETAILED DESCRIPTION OF THE DISCLOSURE

Figure 1:
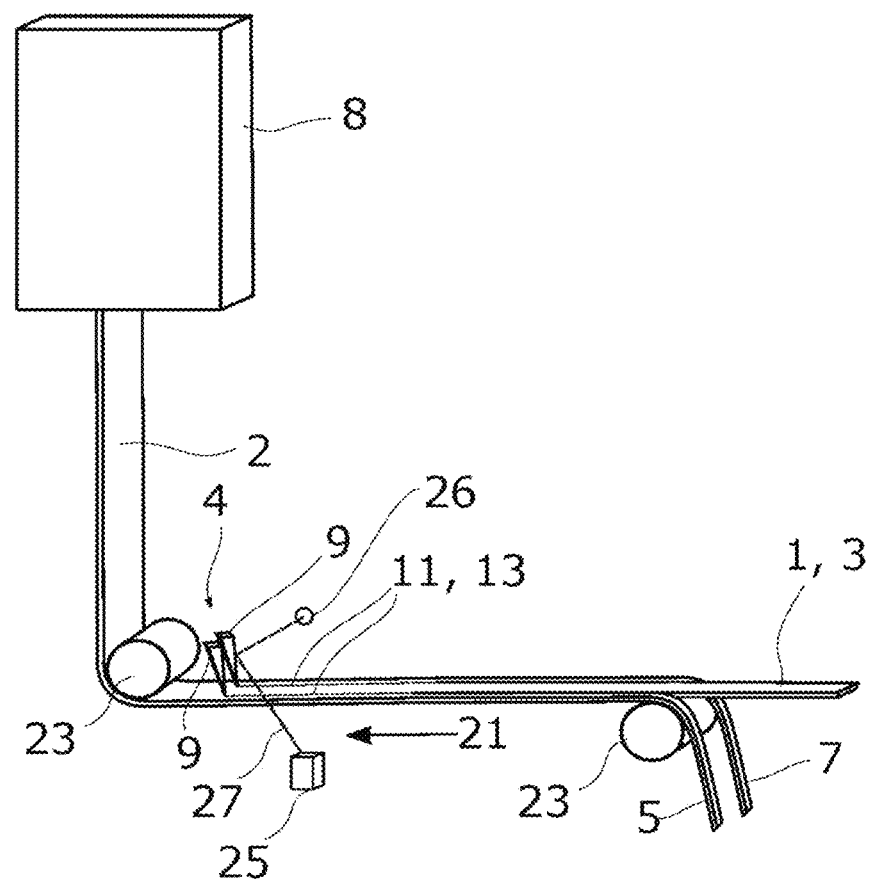
FIG. 1 schematically shows an apparatus for producing thin glasses.

FIG. 1 illustrates an apparatus in which the method for scoring glasses can be applied. The apparatus comprises a glass ribbon forming device 8, illustrated schematically, which is used to produce a glass element 1 in the form of a glass ribbon 3 by hot forming. The hot forming may be achieved, for example, in a down-draw process or overflow-fusion process in which the glass ribbon 3 is drawn downward, as shown. The glass ribbon 3 is guided and deflected to the horizontal by one or more rollers 23. The rollers 23 may moreover in particular be driven so as to serve as an advancement device for the glass scoring apparatus 4.

Due to the hot forming process, thickened beads 5, 7 are formed at the edges of the glass ribbon 3, which are to be severed for further processing. Such processing may include winding the thin glass ribbon 3 into a roll, inter alia. In this case, the thickened beads would interfere by impeding the winding because of their rigidity.

In order to separate these beads 5, 7, the glass is scored along two separation lines 11 extending parallel to the edges of the thin glass ribbon 3 longitudinally thereof. In scoring, deep cracks 13 running into the glass are created along the separation lines 11 extending between the beads and the quality portion of the thin glass ribbon 3 using rigid scoring tools 9. For this purpose, the thin glass ribbon 3 is guided relative to the scoring tools 9, while the scoring tools are pressed against the glass surface 2. As can be seen from the figure, the advancement direction 21 of the scoring tools 9 on the glass surface is opposite to the movement direction of the thin glass ribbon 3 in this setup.

Subsequently, for severing, a bending or tensile or shear momentum is applied along the deep cracks 13 on a further roller 23 such that the glass breaks along the separation line 11 due to the weakening induced by the deep crack, so that the beads 5, 7 separate from the glass ribbon 3. The beads 5, 7 may then be collected in a cullet bunker, for example, to be returned from there into a molten glass from which the thin glass ribbon 3 is formed.

Generally, without being limited to the specific illustrated example, the suggested scoring with an arcuate zone of elastic strain causes the edges resulting from the separation to have a particularly high strength to bending loads. This makes it possible for the thin glass ribbon 3 in the above example, inter alia, to be wind up into a roll and to be stored intermediately before further processing in a long-term stable manner.

Generally, without being limited to the specific illustrated exemplary embodiment, it is particularly advantageous to spatially and/or temporally separate the breaking of the glass along the separation line 11 from the scoring. It is unfavorable for the glass to break directly at the contact point of the scoring tool 9, because in this way the fracture could propagate beyond the position of the contact point in an uncontrolled manner. This would possibly cause the course of the edge to deviate from the intended separation line. According to a preferred embodiment it is therefore contemplated that the bending load or tensile load or shear load is applied onto the glass at a temporal or spatial distance along the separation line 11, so that the fracture of the glass does not propagate to the contact point of the scoring tool 9.

Figure 2:
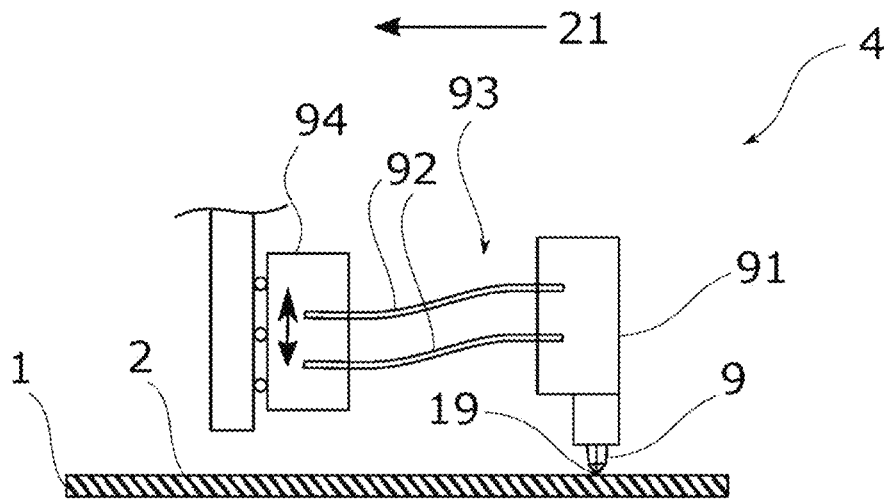
FIG. 2 shows components of an apparatus for scoring glasses.

As already stated above, the scoring tool is rigid merely in the sense that it does not roll over the glass surface at the contact point, but rather is advanced slideably over the glass while usually also slightly penetrating into the glass. In order to achieve a constant contact pressure, a displaceable holder may be provided. One embodiment of such a holder is shown in FIG. 2.

The principle of a preferred embodiment of an apparatus 4 for scoring glasses, in particular thin glass, is to fix the scoring tool 9 in a scoring tool holder 91, and to control the scoring tool holder 91 using a parallel rocker 93. The parallel rocker comprises at least two leaf springs 92 arranged in parallel. Leaf springs 92 permit to press the scoring tool 9 onto the glass surface 2 with a predefined force, while the scoring tool 9 is slideably moved over the glass surface 2. The pressure or contact force may, for example, be adjusted by moving a setting slide 94 on which the parallel rocker 93 is suspended. More generally, the contact force can be adjusted by adjusting the deformation of springs, here leaf springs 92. A device for scoring thin glass, which allows to set a defined contact pressure, is also described in DE 10 2014 117 641.3, and the disclosure thereof with respect to the configuration of the device for scoring thin glass is fully incorporated into the present application.

A parallel rocker 93 as a displaceable holder may as well be implemented differently than by means of leaf springs, for example using support members guided in parallel and pivotally mounted at their ends, while the contact force is then generated by a separate spring acting on the scoring tool holder.

Generally, without being limited to the specific illustrated example, it is therefore contemplated according to one embodiment of the disclosure that the scoring tool 9 is fixed in a scoring tool holder 91, and the scoring tool holder is guided by a parallel rocker 93, and at least one spring element is provided, which applies an adjustable spring force to the scoring tool holder 91 so that the scoring tool 9 is pressed onto the glass surface 2 of a glass element 1 to be scored with a contact force as determined by the spring force.

Figures 3, 4:
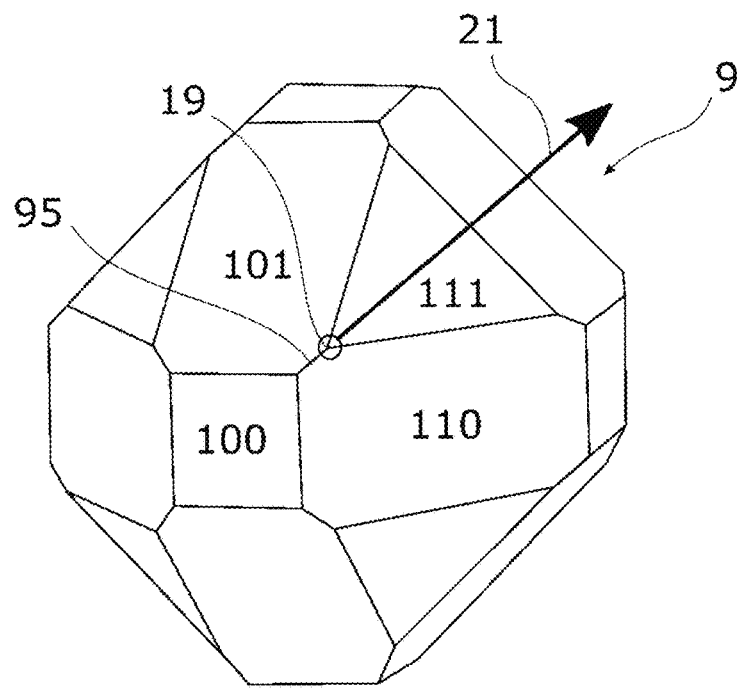
FIG. 3 shows a diamond as a scoring tool.
FIG. 4 shows two diagrams of the forces for achieving a predefined crack depth as a function of the tilt angle of a scoring diamond.

FIG. 3 shows a diamond as a scoring tool 9, having crystal faces (100), (101), (110), and (111). As can be seen from the illustrated shape of the crystal, there are many possibilities for placing the diamond. It has been found that the specific shape of the zone of elastic strain in the glass, which will be explained in more detail below, can be achieved particularly easily by a specific orientation of the diamond with respect to the touchdown or contact point 19 and the advancement direction 21. The combination of contact point 19 and advancement direction 21 that has been found to be favorable is indicated in FIG. 3.

As can be seen, the crystal is oriented such that the contact point on the glass surface 2 is given by the vertex between crystal faces (101), (110), and (111), while the crystal is oriented with respect to the advancement direction such that the (111) face precedes. This orientation principle is not necessarily limited to the specific position of the contact point 19 and the advancement direction 21. Rather, it is contemplated according to one embodiment that the scoring tool 9 has a vertex between three intersecting faces, and that the scoring tool 9 is oriented and placed such that this vertex defines the contact point 19 and one of the faces precedes in the advancement direction 21. Strictly speaking, the scoring tool 9 not only makes punctiform contact at the contact point 19, but is slightly pressed into the glass by the pressure force, so that a small contact area is defined. However, in the present context, the point of the surface of the scoring tool 9 penetrating furthest into the glass or protruding furthest in the placement direction is considered to be the contact point 19. This embodiment does not depend on whether or not a diamond is used as a scoring tool 9. In the case of other hard material tools having such a geometry of the tool tip, a similar formation of the stress zones would result in the glass. However, due to its hardness, the diamond represents a preferred refinement of this embodiment.

Accordingly, in a refinement of the embodiment it is contemplated that the scoring tool 9 comprises a scoring diamond, and that the scoring diamond is oriented such that the vertex between the crystal faces (101), (110), and (111) defines the contact point 19 and so that the crystal face (111) precedes. The edge 95 between the faces (101) and (110) accordingly follows the contact point 19 in this embodiment.

In the following, results of finite element simulations for scoring glass elements shall be discussed. For the calculations it was assumed that the scoring process is symmetrical to the plane defined by the normal of the glass surface 2 (=z) and the scoring direction (=y). A potential rounding of the edges of the scoring tool 9 is neglected. All calculations were performed with a friction coefficient of 0.0. The glass type taken as a basis was the glass marketed by Schott AG under the trade name D263. This glass has the following mechanical properties:

Density: 2.51 g/cm$^3$;
Young's modulus E: 72.9 kN/mm$^2$;

Poisson number $\mu$: 0.208;
Torsion modulus G: 30.1 kN/mm$^2$;
Knoop hardness $HK_{100}$: 590.

The result that particularly strong edges can be obtained with a preceding face is surprising, since larger forces are required for a given scratch depth in this case than if an edge is preceding. FIG. 4 shows two diagrams showing advancement and normal forces as calculated by a finite element calculation which were necessary for introducing a deep crack with a depth of 4.5 μm. The advancement forces $F_y$ and normal forces $F_z$ are plotted as a function of the tilt angle of the scoring diamond. A tilt angle of 0° corresponds to a normal of the (100) face aligned perpendicular to the glass surface 2.

At small tilt angles between 20° and 30°, the edge 95 between two (110) faces of the diamond, or in FIG. 3 between the faces labeled (110) and (101), precedes into the glass. The calculated forces are shown in panel (a), i.e. the diagram on the left side of FIG. 4.

In contrast, at large tilt angles between 40° and 50°, a (111) face of the scoring diamond precedes into the glass. In this case, the advancement direction 21 is oriented as shown in FIG. 3. The calculated forces are shown in FIG. 4 in the diagram of panel (b).

With a scratch depth of 4.5 μm which was defined to be constant in the finite element calculations, significantly lower normal forces $F_z$ are resulting for the preceding edge (FIG. 4, panel (a)) than for the preceding (111) face (panel (b)). This is attributable to the fact that in the case of a preceding (111) face, a larger glass area has to be pressed in the negative z-direction.

However, according to FIG. 4, panel (b), even with a preceding (111) face, the contact forces necessary to create a deep crack are low. Generally, regardless of the type of scoring tool, a favorable contact or pressure force of the scoring tool 9 onto the glass surface 2 is in the range from 0.2 N to 5 N. Furthermore, it is generally favorable if during the scoring a plastically deformed zone is formed in the glass below the deep crack, which reaches into a depth ranging from 2 μm to 8 μm. This plastically deformed zone can be recognized from the fracture pattern. It is moreover favorable to perform the scoring not too fast, inter alia in order to avoid variations in the pressure force of the scoring tool. On the other hand, the advancement should not be too slow in order to avoid a slip-stick phenomenon. Accordingly, it is contemplated according to a further embodiment that the advancement rate is in the range from 0.025 m/s to 5 m/s.

Figure 5:
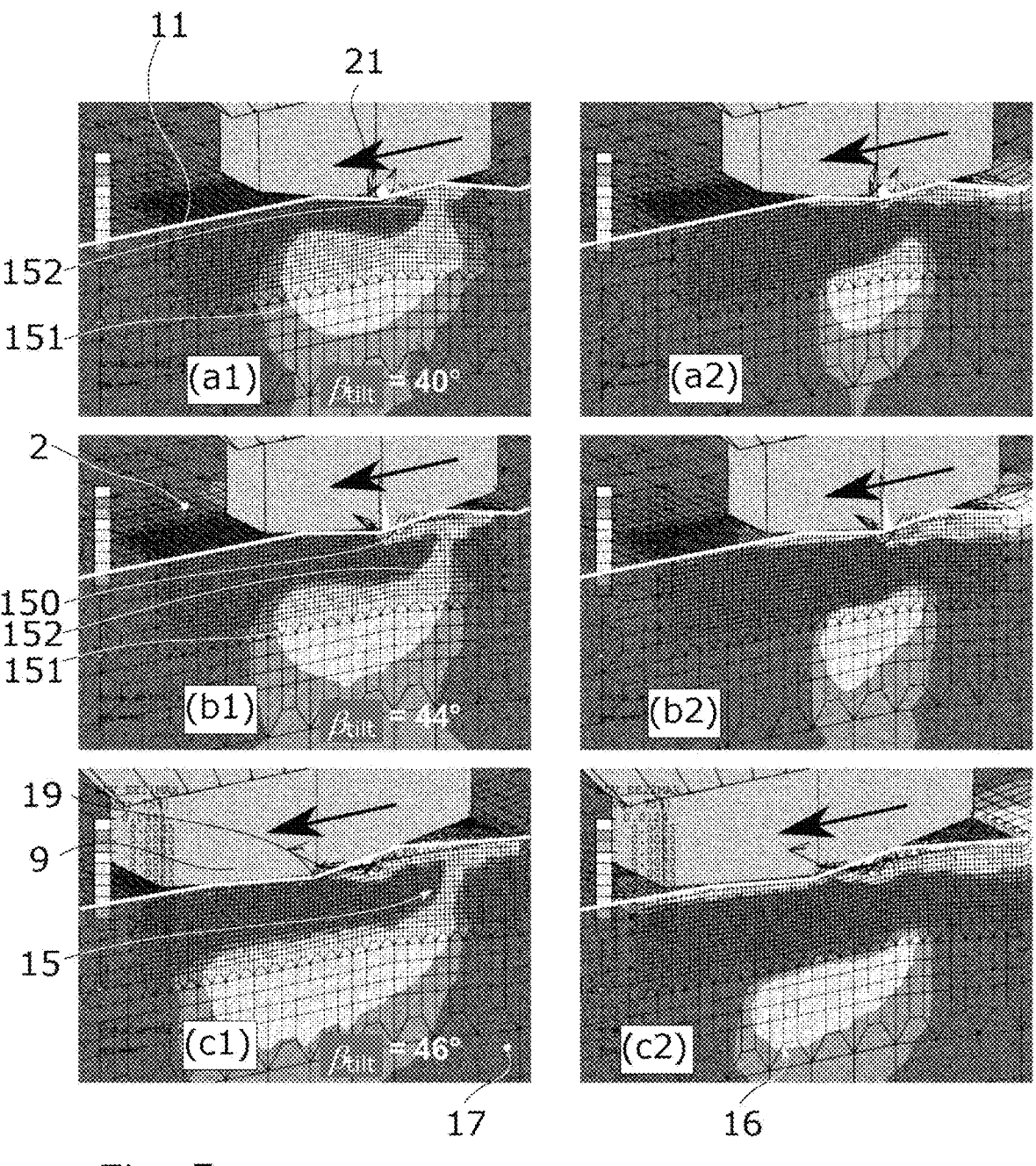
FIGS. 5 and 6 show finite element simulations of the elastic strains exerted by the scoring tool across and along the separation line for different tilt angles of the scoring tool.

The elastic strain with directional component of the elastic strain parallel to the glass surface 2 and perpendicular to the separation line 11 will also be referred to as $\varepsilon_{xx}$ below. The further elastic strain in the direction along the separation line is designated by the symbol $\varepsilon_{yy}$. FIG. 5 shows simulations of strains $\varepsilon_{xx}$, $\varepsilon_{yy}$ in the glass for three different tilt angles indicated in the panels. Each of panels a1, a2, b1, b2, c1, c2 shows a section cut through the glass element 1 along a plane 17 defined by the separation line 11 perpendicular to the glass surface 2 during the scoring process. Due to the deformation caused by the pressure of the scoring tool 9, the separation line 11 is not a straight line in the perspective views of the representations. All simulations were based on a depth of the deep crack of 4.5 μm.

The tilt angle $\beta_{tilt}$ is 40° in panels a1, a2, 44° in panels b1, b2, and 46° in panels c1, c2. With such tilt angles, the (111) face of the scoring diamond is preceding, as explained above, while the edge 95 is trailing behind the contact point 19 when scoring in the advancement direction 21.

Each of the left panels a1, b1, c1 shows the zone 15 of elastic strain $\varepsilon_{xx}$ in the direction along the glass surface 2 and perpendicular to the separation line 11, i.e. in the plane 17. This zone is marked as a light area in each case. Panels a2, b2, c2 on the right side show the zone of elastic strain $\varepsilon_{yy}$ in the direction of the separation line 11, also marked as a light area. As can be seen from panels a1, b1, c1, the zone 15 has a characteristic arc, which opens in the advancement direction 21 of the scoring tool 9. This arc 15 or U-shaped zone has two legs 150, 151, of which one region 150 is located adjacent to the glass surface 2 and includes the contact point 19. The other leg 151 of the arc 15 is located inside the glass 2.

As can furthermore be seen from the panels a2, b2, c2, the elastic strain $\varepsilon_{yy}$ or the zone 16 of elastic strain along the separation line 11 has a different shape and comprises an isolated portion in the interior of the glass, and this component of the elastic strain as a whole is weaker than the elastic strain $\varepsilon_{xx}$. This zone of elastic strain located in the interior of the glass in the direction along the separation line 11 may be considered as a further alternative or additional feature of the scoring method, independently of the specific illustrated exemplary embodiments. Accordingly, as an alternative or in addition to the feature of a zone 15 of elastic strain in the glass in the direction along the glass surface 2 and perpendicular to the separation line 11, which extends in an arc 152 in the plane 17, it is contemplated according to a further aspect of the disclosure, that an isolated zone 16 of elastic strain is located inside the glass element 1.

Accordingly, the disclosure also relates to a method for scoring glasses, preferably thin glasses having a thickness of at most 0.5 mm in preparation of separation for the processing of glass elements 1, in which a deep crack 13 is produced in the glass along an intended separation line 11 by exerting pressure onto the glass surface 2 using a rigid scoring tool 9, and in which the scoring tool 9, by the pressure exerted on the glass surface and by the advancement force when introducing the deep crack 13 generates a zone 16 of elastic strain in the glass in the direction along the separation line 11, which zone 16 is isolated inside the glass of the glass element 1 below the contact point 19 of the scoring tool 9.

Figure 6:
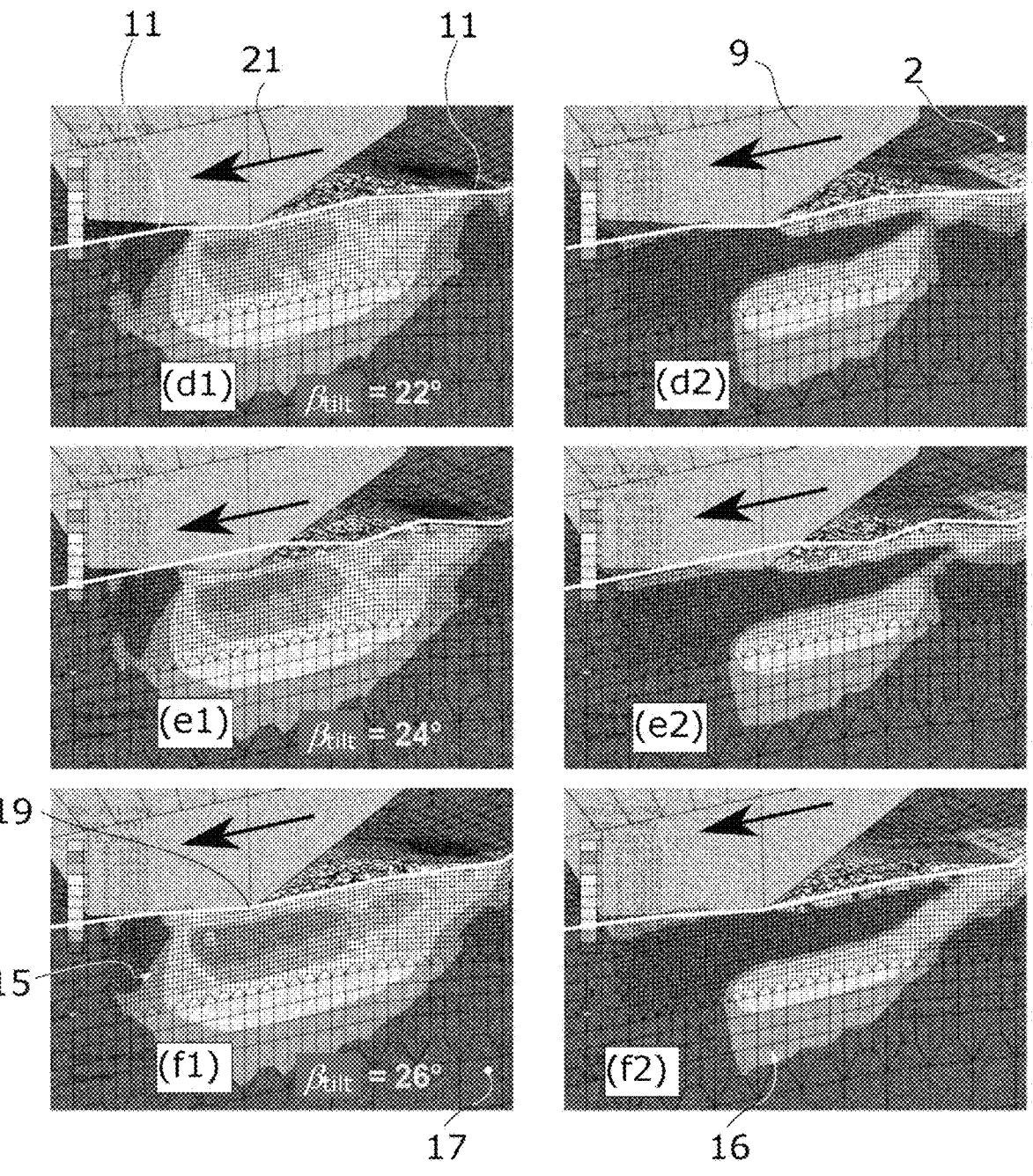

FIG. 6 shows further simulations with smaller tilt angles of 22° (panels d1, d2), 24° (panels e1, e2), and 26° (panels f1, f2). In the case of such tilt angles, the edge 95 of the scoring diamond is preceding and the (111) face is trailing behind the contact point 10 as seen in the advancement direction 21, as explained above. Zones 15, 16 are again marked as light areas, and high strains are again shown in darker shades. In comparison to FIG. 5, it can be seen that the zone 15 of elastic strain $\varepsilon_{xx}$ does not exhibit any arcuate shape. On the contrary, the strain $\varepsilon_{xx}$ rather decreases in the radial direction, starting from the contact point 19 (panels d1, e1, f1). By contrast, however, the strain zone $\varepsilon_{yy}$ has approximately an arcuate shape here (panels d2, e2, f2). The shape of strains $\varepsilon_{xx}$ and $\varepsilon_{yy}$ as shown in FIG. 6 has proven to be inferior in terms of achievable edge strengths and accuracy of shape of the course of the edge that is achievable.

From these examples it can be seen that even small modifications in the orientation of the scoring tool 9 can have significant impacts on the shape of stress zones in the glass, in particular on the spatial distribution of the elastic strains $\varepsilon_{xx}$ and $\varepsilon_{yy}$. Therefore, precise alignment of the scoring tool is advantageous to ensure that the intended arcuate strain zone is achieved. Particularly advantageously, the orientation is controlled optically. For this purpose, it is contemplated according to a refinement of the disclosure to provide a device for detecting the direction of a light beam reflected by the scoring tool 9. Typically, a light source is additionally provided to direct a light beam from a predefined direction onto the scoring tool 9. Such an arrangement comprising a light source 26 and a device 25 for detecting the direction of a light beam 27 is schematically shown in FIG. 1 for one of the scoring tools 9. Accordingly, in one embodiment, the orientation of the scoring tool 9 is detected using a device 25 for detecting the direction of a light beam 27 on the basis of the detected direction of a light beam 27 reflected on the scoring tool 9, and the orientation of the scoring tool 9 is adjusted or corrected on the basis thereof. It is particularly advantageous if the scoring tool 9 comprises a crystal, as in the example of FIG. 3, and if the direction of a light beam 27 reflected on a crystal face is detected. An arrangement for aligning the scoring tool with optical control is also known from DE 10 2016 101 766 A1, and the disclosure thereof with respect to the configuration of the arrangement of the scoring tool, optical detection and means for aligning the scoring tool is fully incorporated into the subject-matter of the present application by reference.

Figure 7:
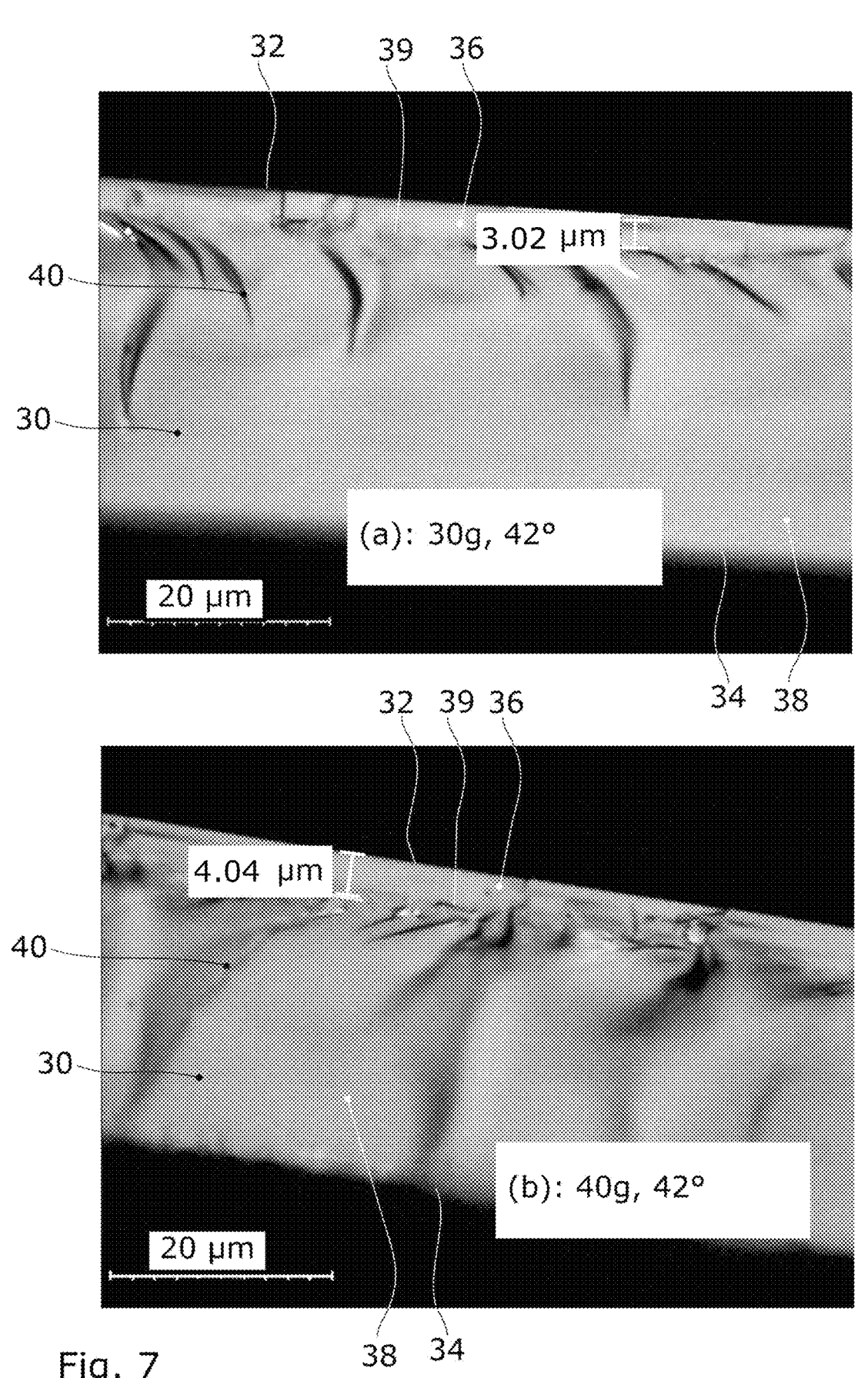
FIG. 7 shows two light microscope images of the fracture edges of thin glasses.

Characteristic features of the glass edges produced by the method and by the device implemented for carrying out the method will now be explained below. For this purpose, FIG. 7 shows two microscopic images of the edge face 30 of an edge produced by scoring and subsequent breaking by the method presently described. The glass element 1 cut in this manner has a thickness of 50 μm. The processes by which the edges of the two images were produced differ in terms of the pressure force of the scoring tool 9 in the form of a scoring diamond. In panel (a), the scoring diamond was pressed against the glass surface with a pressure force of 30 g, i.e. with about 0.3 N, and for the sample shown in panel (b) with a pressure force of 40 g. The tilt angle of the diamond was 42° in both cases, which means that during scoring the (111) face is preceding and the edge 95 is trailing behind here, as described above.

As can be clearly seen in both cases, the edge face exhibits two differently structured strip-like sections extending longitudinally of the edge face 30. Each of the sections adjoins a respective one of the edge lines 32, 34 where the edge face 30 intersects with the glass faces 2 of the glass element 1. The strip-like edge section 36 terminating at the upper edge line 32 in the images is created by the deep crack in each case. The other edge section 38 is created by the breaking of the glass along the separation line 11. It can clearly be seen that the edge section 36 exhibits lower waviness than the edge section 38 created by the breaking. In both examples, it can also be seen that the waviness of section 38 decreases from the boundary line 39 towards the edge line 34. Furthermore, the boundary line extends in a very rectilinear manner and at a defined distance from edge lines 32, 34. This shows that the scoring process produces a plastically deformed zone of very constant depth below the deep crack 13, which can be attributed to the particular arcuate shape of the zone of elastic strain $\varepsilon_{xx}$.

The edges formed in this way have proven to be very resistant to bending stresses. It was possible to produce edges with a breaking strength of about 1000 MPa.

Thus, according to a further aspect, a sheet-like glass element 1 is provided with the method and the corresponding apparatus described herein, which has a thickness not more than 0.5 mm, preferably not more than 250 μm, most preferably at most 125 μm, and which has an edge with an edge face 30 intersecting the opposite glass faces 2 along two edge lines 32, 24. The edge face 30 comprises strip-like sections 36, 38 each one adjoining a respective one of the edge lines 32, 34, which sections interface along a boundary line 39 that extends between the edge lines 32, 34, wherein a first section 36 characterizing a plastically deformed region as created below the deep crack 13 during scoring has a width ranging from 2 μm to 8 μm and exhibits lower waviness than a second strip-like section 38 (namely the surface produced by the breaking), and wherein the waviness of the second strip-like section decreases towards the edge line 34 this section 38 adjoins.

As already stated, the boundary line extends in a very constant depth and thus parallel to the glass surface. In accordance with a further feature, an average range of variation of the distance of the boundary line 39 to the glass surface or to the edge line 32 adjoining the first section 36 is less than 0.5 μm, preferably less than 0.25 μm. This allows to specify very accurately the depth of the crack in the examples, which is 3.02 μm in the example of panel (a), and 4.04 μm in the example of panel (b).

Finally, it is particularly apparent in the example of panel (a) that the waviness of the second section moreover exhibits a special pattern. It can be seen that the second section 38 exhibits curved or sickle-like wavy patterns 40. In this case, the angle between the curve and the boundary line 39 between the first section 36 and the second section 38 increases with increasing distance from the boundary line. Thus, in their course starting from the boundary line 39, the curved wavy patterns tend more and more towards the edge line 34 adjoining the second section. At least in most cases, the wavy pattern terminates at a distance from the edge line 34. This particular shape may be responsible for the very high edge strength.

It will be apparent to a person skilled in the art that the subject-matter of the present application is not limited to the embodiments, but rather may be varied within the scope of the disclosure and the claims. For example, scoring was performed using a diamond in the examples, however, other hard material crystals such as corundum or silicon carbide are suitable as well.

| LIST OF REFERENCE NUMERALS | |
|---|---|
| 1 | Glass element |
| 2 | Glass surface |
| 3 | Thin glass ribbon |
| 4 | Apparatus for scoring glasses |
| 5, 7 | Bead |
| 8 | Glass ribbon forming device |
| 9 | Scoring tool |
| 11 | Separation line |
| 13 | Deep crack |
| 15 | Zone of elastic strain in the direction along glass surface 2 and perpendicular to separation line 11 |
| 16 | Zone of elastic strain in the direction along separation line 11 |
| 17 | Plane |
| 19 | Contact point of 9 |
| 21 | Advancement direction of 9 |
| 23 | Roller |
| 25 | Device for detecting the direction of a light beam reflected by the scoring tool 9 |
| 26 | Light source |
| 27 | Light beam |
| 30 | Edge face of 1 |
| 32, 34 | Edge line between 2, 30 |
| 36 | First edge section |
| 38 | Second edge section |
| 39 | Boundary line between 36, 38 |
| 40 | Wavy structure |
| 91 | Scoring tool holder |
| 92 | Leaf spring |
| 93 | Parallel rocker |

-continued

| LIST OF REFERENCE NUMERALS | |
|---|---|
| 94 | Setting slide |
| 95 | Edge between two (110) faces |
| 150, 151 | Legs of 15 |
| 152 | Arc |

What is claimed is:

1. A sheet-like glass element, comprising:
a substrate element having glass faces and a thickness less than or equal to 0.5 mm;
an edge of the substrate element with an edge face intersecting opposite glass faces along two edge lines; and
a boundary line that extends between the edge lines,
wherein the edge face comprises strip-like sections each one adjoining a respective one of the edge lines,
wherein the strip-like sections interface along the boundary line, and have a first section with a width ranging from 2 μm to 8 μm and have a first waviness that is lower than a second waviness of a second strip-like section, and
wherein the second waviness decreases towards the edge line.

2. The glass element of claim 1, wherein the boundary line has a distance from the edge line adjoining the first section with an average range of variation that is less than 0.5 μm.

3. The glass element of claim 1, wherein the boundary line has a distance from the edge line adjoining the first section with an average range of variation that is less than 0.25 μm.

4. The glass element of claim 1,
wherein the second section exhibits curved or sickle-like wavy patterns, and
wherein, between the curved or sickle-like wavy patterns and the boundary line between the first section and the second section, there is an angle that increases with an increasing distance from the boundary line.

5. The glass element of claim 1, wherein the edge has a breaking strength of about 1000 MPa.

6. The glass element of claim 1, wherein the thickness is less than or equal to 250 μm.

7. The glass element of claim 1, wherein the thickness is less than or equal to 125 μm.

8. The glass element of claim 4, wherein the curved or sickle-like wavy pattern terminates at a distance from one of the edge lines.

9. The glass element of claim 1, wherein the boundary line extends rectilinearly and at a defined distance from the edge lines.

10. The glass element of claim 1, further comprising:
a density of 2.51 g/cm3;
a Young's modulus E: of 72.9 kN/mm2;
a Poisson number μ of: 0.208;
a Torsion modulus G of 30.1 kN/mm2; and
a Knoop hardness HK100: 590.

11. A cover glass for a device, the cover glass comprising:
the sheet-like glass element of claim 1,
wherein the device is at least one device selected from the group consisting of:
a display device, a touch panel, a solar cell, a semiconductor module, and an LED light source.

12. A device, the device comprising:
the sheet-like glass element of claim 1,
wherein the device is at least one device selected from the group consisting of: a capacitor, a thin-film battery, a flexible printed circuit board, a flexible organic light-emitting diode, flexible photovoltaic modules, and an e-paper.

* * * * *